(12) United States Patent
Lee (10) Patent No.: US 11,203,412 B2
(45) Date of Patent: Dec. 21, 2021

(54) FAN-IN-WING AERIAL VEHICLE AND METHOD FOR CONTROLLING POSTURE THEREOF

(71) Applicant: KOREA AEROSPACE RESEARCH INSTITUTE, Daejeon (KR)

(72) Inventor: Jung Hoon Lee, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 246 days.

(21) Appl. No.: 16/462,444

(22) PCT Filed: Dec. 15, 2017

(86) PCT No.: PCT/KR2017/014678
§ 371 (c)(1),
(2) Date: May 20, 2019

(87) PCT Pub. No.: WO2018/110987
PCT Pub. Date: Jun. 21, 2018

(65) Prior Publication Data
US 2019/0375492 A1 Dec. 12, 2019

(30) Foreign Application Priority Data
Dec. 15, 2016 (KR) .......................... 10-2016-0171919

(51) Int. Cl.
*B64C 27/20* (2006.01)
*B64C 11/00* (2006.01)
(Continued)

(52) U.S. Cl.
CPC ............ *B64C 11/001* (2013.01); *B64C 11/46* (2013.01); *B64C 27/02* (2013.01); *B64C 27/08* (2013.01);
(Continued)

(58) Field of Classification Search
CPC ........................... B64C 27/20; B64C 29/0016
See application file for complete search history.

(56) References Cited

U.S. PATENT DOCUMENTS 3,179,353 A * 4/1965 Peterson ............. B64C 29/0025
244/12.3
4,828,203 A 5/1989 Clifton et al.
(Continued)

FOREIGN PATENT DOCUMENTS

JP 2012240667 A 12/2012
KR 100938547 B1 1/2010
(Continued)

OTHER PUBLICATIONS

International Search Report issued in corresponding application No. PCT/KR2017/014678 dated Mar. 16, 2018 (5 pages).
(Continued)

*Primary Examiner* — Brian M O'Hara
(74) *Attorney, Agent, or Firm* — Osha Bergman Watanabe & Burton LLP (57) ABSTRACT

A fan-in-wing aerial vehicle according to an embodiment may comprise: a fuselage; main wings expending from both sides of the fuselage in the span direction; rotors rotatably mounted inside the main wings, respectively; and opening/closing portions installed on the main wings such that the same can be opened/closed and thereby expose the rotors to the outside or conceal the rotors from the outside, respectively.

9 Claims, 10 Drawing Sheets

(51) Int. Cl.
  *B64C 11/46* (2006.01)
  *B64C 27/02* (2006.01)
  *B64C 27/08* (2006.01)
  *B64C 29/00* (2006.01)
  *B64C 29/02* (2006.01)
(52) U.S. Cl.
  CPC .......... *B64C 27/20* (2013.01); *B64C 29/0016* (2013.01); *B64C 29/02* (2013.01)

(56) References Cited

U.S. PATENT DOCUMENTS

| | | |
|---|---|---|
| 6,561,456 B1 | 5/2003 | Devine |
| 7,032,861 B2 * | 4/2006 | Sanders, Jr. ............ B64C 27/12 244/12.1 |
| 7,410,122 B2 | 8/2008 | Robbins et al. |
| 2006/0192046 A1 | 8/2006 | Heath et al. |
| 2014/0158816 A1 | 6/2014 | DeLorean |

FOREIGN PATENT DOCUMENTS

| | | |
|---|---|---|
| KR | 20100020080 A | 2/2010 |
| KR | 20100026130 A | 3/2010 |
| KR | 20140058854 A | 5/2014 |

OTHER PUBLICATIONS

Written Opinion of the International Searching Authority issued in corresponding application No. PCT/KR2017/014678 dated Mar. 16, 2018 (6 pages).

* cited by examiner

FAN-IN-WING AERIAL VEHICLE AND METHOD FOR CONTROLLING POSTURE THEREOF

TECHNICAL FIELD

Example embodiments relate to a fan-in-wing aerial vehicle and a method of controlling a posture of the fan-in-wing aerial vehicle.

BACKGROUND ART

Various types of aerial vehicles have been developed by strengthening the strengths and making up for the weaknesses of existing aerial vehicles including, for example, a fixed-wing aircraft which may fly at a high speed and has a high flight endurance record although requiring a long runway and an additional facility for taking off and landing, and a rotary-wing aircraft which may take off and land unrestrictedly regardless of an environment or a location and make a hovering flight although not being able to readily fly at a high speed and having relatively low levels of flight stability, flight endurance, and travel range.

For example, U.S. Pat. No. 7,410,122 discloses a vertical takeoff and landing (VTOL) unmanned aerial vehicle (UAV) with lift fans in joined wings.

DISCLOSURE OF INVENTION

Technical Goals

An aspect provides a fan-in-wing aerial vehicle and a method of controlling a posture of the fan-in-wing aerial vehicle, which allows a rotary wing to be opened or closed with respect to an outside, thereby enabling a vertical takeoff and landing and also a hovering flight and a forward flight.

Another aspect also provides a fan-in-wing aerial vehicle and a method of controlling a posture of the fan-in-wing aerial vehicle, which controls a tilting angle of an upper hatch with respect to a reference plane or a tilting angle of a lower hatch with respect to the reference plane, thereby enabling a vertical takeoff and landing and also a hovering flight and a forward flight.

Technical Solutions

According to an example embodiment, there is provided a fan-in-wing aerial vehicle including a fuselage, a fixed wing extending from both sides of the fuselage in a span direction, a rotary wing rotatably mounted inside the fixed wing, and an opening and closing portion installed on the fixed wing such that the opening and closing portion is configured to be opened and closed, and configured to allow the rotary wing to be opened to or closed from an outside.

The opening and closing portion may include an upper hatch disposed above the rotary wing and configured to be tilted with respect to a reference plane, and a lower hatch disposed below the rotary wing and configured to be tilted with respect to the reference plane.

At least one of the upper hatch or the lower hatch may be formed on the fixed wing to extend in a span direction of the fixed wing, or formed on the fixed wing to extend in a chord direction of the fixed wing.

Each of the upper hatch and the lower hatch may be configured to rotate with respect to the fixed wing.

The fan-in-wing aerial vehicle may further include a sub rotary wing installed in at least one of a front portion of the fuselage or a rear portion of the fuselage to be rotated and tilted with respect to a reference plane.

The fixed wing may further include an outboard configured to be folded and unfolded upwards or downwards from the fuselage.

The rotary wing may include a duct installed in the fixed wing, a blade rotatably installed at a center of the duct in a radial direction of the duct, and a hinge configured to connect the duct and a blade tip of the blade.

According to another example embodiment, there is provided a fan-in-wing aerial vehicle including a fuselage, a fixed wing extending from both sides of the fuselage in a span direction, a rotary wing rotatably mounted inside the fixed wing, an upper hatch disposed above the rotary wing and configured to be tilted with respect to a reference plane, and a lower hatch disposed below the rotary wing and configured to be tilted with respect to the reference plane. A tilting angle of at least one of the upper hatch or the lower hatch may be controlled to allow the rotary wing to be opened to or closed from an outside.

The upper hatch and the lower hatch may be configured to be tilted, independently, with respect to the reference plane.

When the fan-in-wing aerial vehicle makes a vertical takeoff and landing, the upper hatch and the lower hatch may be configured to be tilted vertically with respect to the reference plane and remain tilted.

When the fan-in-wing aerial vehicle makes a forward flight on the reference plane, the upper hatch and the lower hatch may be configured to be tilted at a set angle with respect to the reference plane towards a rear of the fan-in-wing aerial vehicle and remain tilted.

The fan-in-wing aerial vehicle may further include a first sub rotary wing rotatably installed on one side of the fuselage, and a second sub rotary wing rotatably installed on another side of the fuselage. The first sub rotary wing and the second sub rotary wing may be configured to be tilted, independently, with respect to the reference plane.

Advantageous Effects

According to example embodiments described herein, a fan-in-wing aerial vehicle and a method of controlling a posture of the fan-in-wing aerial vehicle may allow a rotary wing to be opened to or closed from an outside, thereby enabling a vertical takeoff and landing and also a hovering flight and a forward flight.

According to example embodiments described herein, a fan-in-wing aerial vehicle and a method of controlling a posture of the fan-in-wing aerial vehicle may control a tilting angle of an upper hatch with respect to a reference plane or a tilting angle of a lower hatch with respect to the reference plane, thereby enabling a vertical takeoff and landing and also a hovering flight and a forward flight.

Advantageous effects of the fan-in-wing aerial vehicle and the method of controlling a posture of the fan-in-wing aerial vehicle are not limited to what has been described in the foregoing, and other effects may be explicitly understood by those skilled in the art from the following description.

BEST MODE FOR CARRYING OUT THE INVENTION

Hereinafter, example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, descriptions of features that are known in the art may be omitted for increased clarity and conciseness.

Terms such as first, second, A, B, (a), (b), and the like may be used herein to describe components. Each of these terminologies is not used to define an essence, order, or sequence of a corresponding component but used merely to distinguish the corresponding component from other component(s). It should be noted that if it is described in the specification that one component is "connected," "coupled," or "joined" to another component, a third component may be "connected," "coupled," and "joined" between the first and second components, although the first component may be directly connected, coupled or joined to the second component.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The term "span direction" used herein refers to a length direction of a fixed wing, and the term "chord direction" used herein refers to a direction connecting a leading edge and a trailing edge of an airfoil of the fixed wing.

The term "pitch direction" used herein refers to a direction of rotation of an aerial vehicle relative to an axis of a span direction of a fixed wing, and the term "roll direction" used herein refers to a direction of rotation of the aerial vehicle relative to an axis of a chord direction of the fixed wing. In addition, the term "yaw direction" used herein refers to a direction of rotation of an aerial vehicle relative to an axis vertical to each of an axis of a span direction of a fixed wing and an axis of a chord direction of the fixed wing.

The term "reference plane" used herein refers to a runway, a road, or a virtual surface in the air, on or in which an aerial vehicle slides or glides.

In addition, that "A rotates relative to B" or "A rotates with respect to B" is construed that A has a rotation axis forming a set angle with B and rotates about the rotation axis.

Hereinafter, a structure of a fan-in-wing aerial vehicle 1 and a method of controlling a posture thereof according to an example embodiment will be described in detail with reference to FIGS. 1 through 8.

Referring to FIGS. 1 through 8, the aerial vehicle 1 includes a fuselage 11, a fixed wing 12, a rotary wing 13, an opening and closing portion 14, a sub rotary wing 15, an outboard 16, and a tail wing 17.

Figure 1:
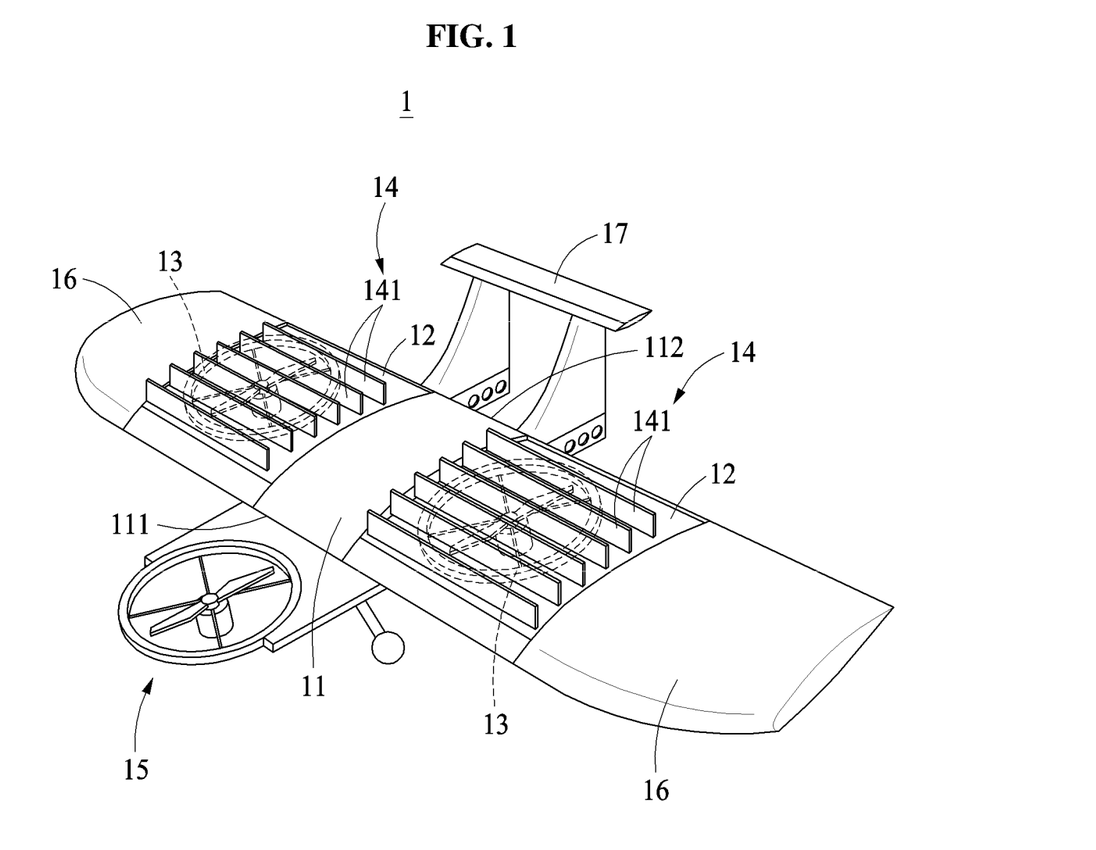
FIG. 1 is a perspective view of a fan-in-wing aerial vehicle according to an example embodiment.

The fuselage 11 is a center portion of the aerial vehicle 1, and forms a center of gravity and a center of rotation of the aerial vehicle 1.

The fixed wing 12 is fixed to the fuselage 11, and configured to receive a lift force from a flight of the aerial vehicle 1. The fixed wing 12 extends from both sides of the fuselage 11 in a span direction, and is configured to maintain a posture of the aerial vehicle 1.

The rotary wing 13 is installed on a rotation axis, and configured to generate a lift force while rotating around the rotation axis. The rotary wing 13 is rotatably installed inside the fixed wing 12.

Figure 7:
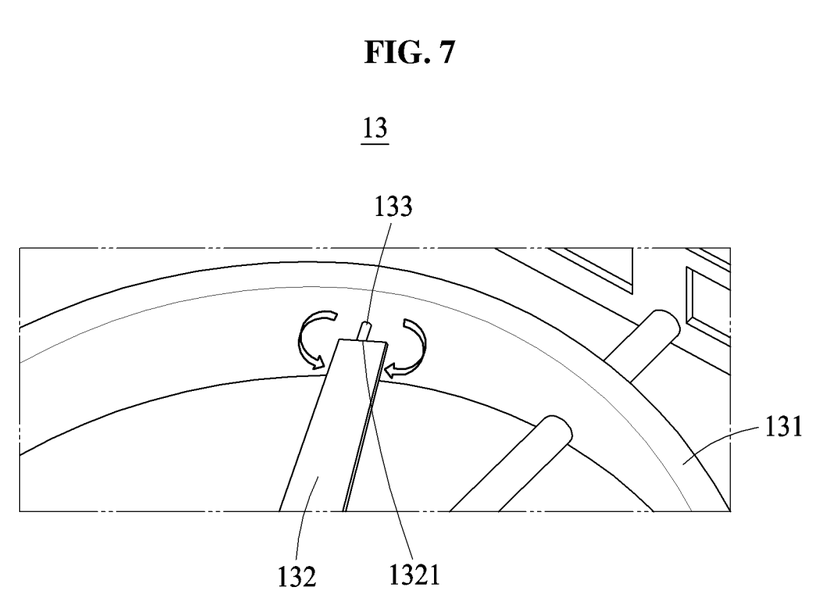
FIG. 7 is an enlarged view of a portion of a rotary wing of a fan-in-wing aerial vehicle according to an example embodiment.

According to an example embodiment, referring to FIG. 7, the rotary wing 13 includes a duct 131, a blade 132, and a hinge 133 configured to connect the duct 131 and a blade tip 1321. The duct 131 includes a passage that allows a fluid such as air to move in the duct 131, and is installed in the fixed wing 12 to improve aerodynamic efficiency of the aerial vehicle 1. The blade 132 is rotatably installed at a center of the duct 131 in a radial direction of the duct 131. The blade 132 is configured to be tilted relative to an axis of a length direction of the blade 132. The hinge 133 is configured to connect the duct 131 and the blade tip 1321 of the blade 132. Through such a structure, it is possible to prevent a collision between the blade 132 and an upper hatch 141 or a lower hatch 142. When the blade 132 rotates in a circumferential direction of the duct 131 from the center of the duct 131, the blade tip 1321 of the blade 132 may receive a force in an axial direction of the duct 131. Here, the hinge 133 connects the blade tip 1321 and the duct 131 to prevent the collision.

The opening and closing portion 14 is configured to allow the rotary wing 13 to be opened to or closed from an outside of the aerial vehicle 1, which is an environment surrounding the aerial vehicle 1. The opening and closing portion 14 is installed such that it is capable of being opened or closed with respect to the fixed wing 12. Such a structure may enable the aerial vehicle 1 to make a vertical takeoff and landing, and make a hovering flight in the air with respect to a reference plane (RP) and a forward flight on the RP by a propulsive force. The opening and closing portion 14 includes the upper hatch 141 and the lower hatch 142.

The upper hatch 141 is disposed above the rotary wing 13 to be tilted with respect to the RP. The lower hatch 142 is disposed below the rotary wing 13 to be tilted with respect to the RP. Such a structure may allow air above the aerial vehicle 1 to flow into the rotary wing 13 as the upper hatch 141 is opened, and the air flowing in the rotary wing 13 to flow below the aerial vehicle 1 as the lower hatch 142 is opened.

The upper hatch 141 and the lower hatch 142 are configured to be tilted, independently, with respect to the RP.

Figure 2:
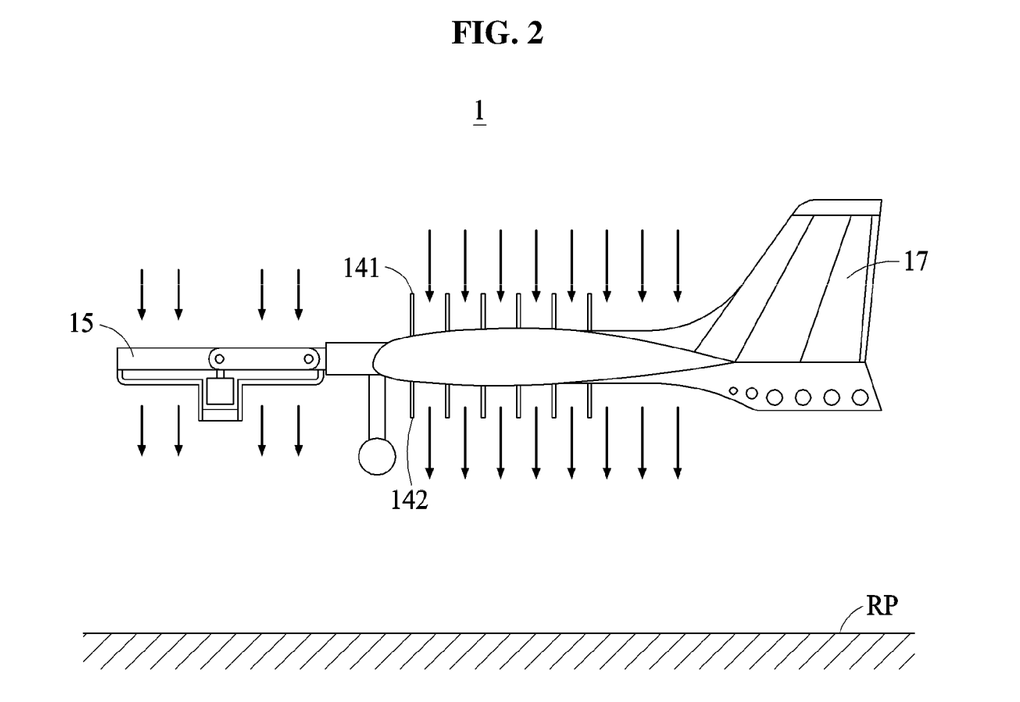
FIG. 2 is a side view of a fan-in-wing aerial vehicle during a vertical takeoff and landing or during a hovering flight in the air according to an example embodiment.

According to an example embodiment, referring to FIG. 2, the upper hatch 141 and the lower hatch 142 are configured to be tilted to be practically vertical to the RP, and remain tilted. Thus, air flowing vertically to the RP along the upper hatch 141 may flow through the rotary wing 13 and then flow vertically to the RP along the lower hatch 142 towards a rear of the fuselage 11, and thus the aerial vehicle 1 may obtain a propulsive force vertical to the RP and make a vertical takeoff and landing or a hovering flight in the air.

Figure 3:
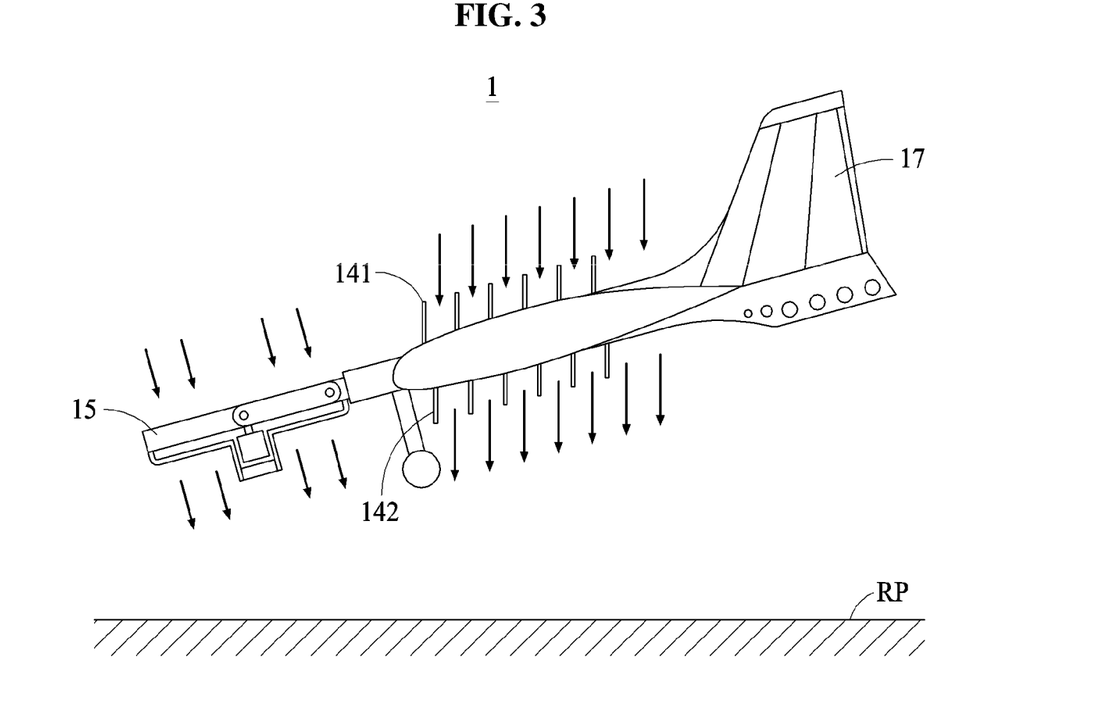
FIG. 3 is a side view of a fan-in-wing aerial vehicle during a forward flight in the air according to an example embodiment.

According to an example embodiment, referring to FIG. 3, even when the fuselage 11 is tilted with respect to the RP, the upper hatch 141 and the lower hatch 142 are configured to be tilted to be practically vertical to the RP, and then remain tilted. Thus, the aerial vehicle 1 may simultaneously obtain a vertically propulsive force with respect to the RP and a forward propulsive force, and thus may make a vertical takeoff and landing.

Figure 4:
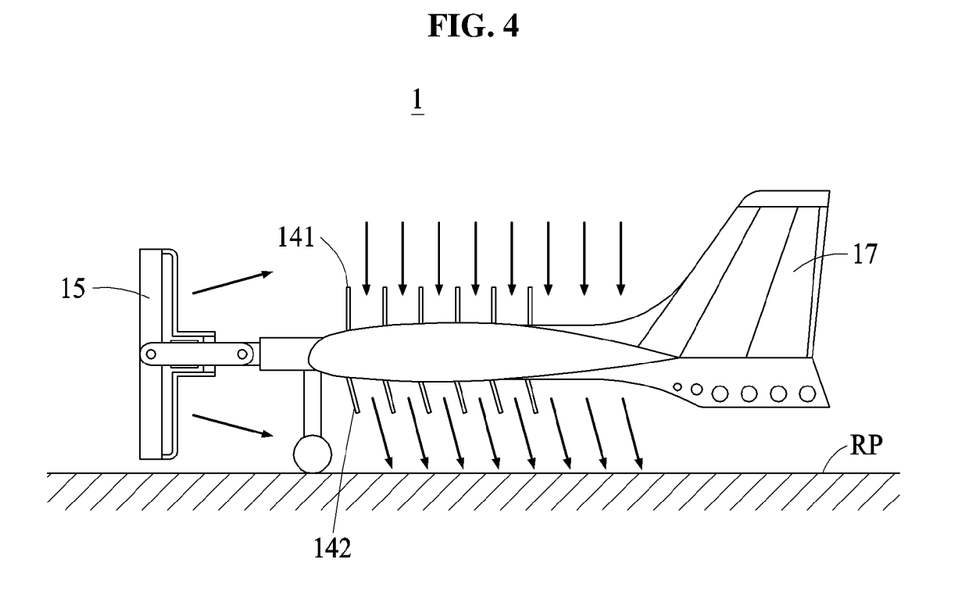
FIG. 4 is a side view of a fan-in-wing aerial vehicle during an example forward flight on a reference plane according to an example embodiment.

According to an example embodiment, referring to FIG. 4, the upper hatch 141 is configured to be tilted to be practically vertical to the RP, and then remain tilted. The lower hatch 142 is configured to be tilted to form a set angle with the RP downwards or rearwards from the fuselage 11, and remain tilted. Thus, air flowing vertical to the RP along the upper hatch 141 may flow through the rotary wing 13 and then flow along the lower hatch 142 downwards or rearwards from the fuselage 11, and thus the aerial vehicle 1 may obtain a forward propulsive force and make a forward flight.

Figure 5:
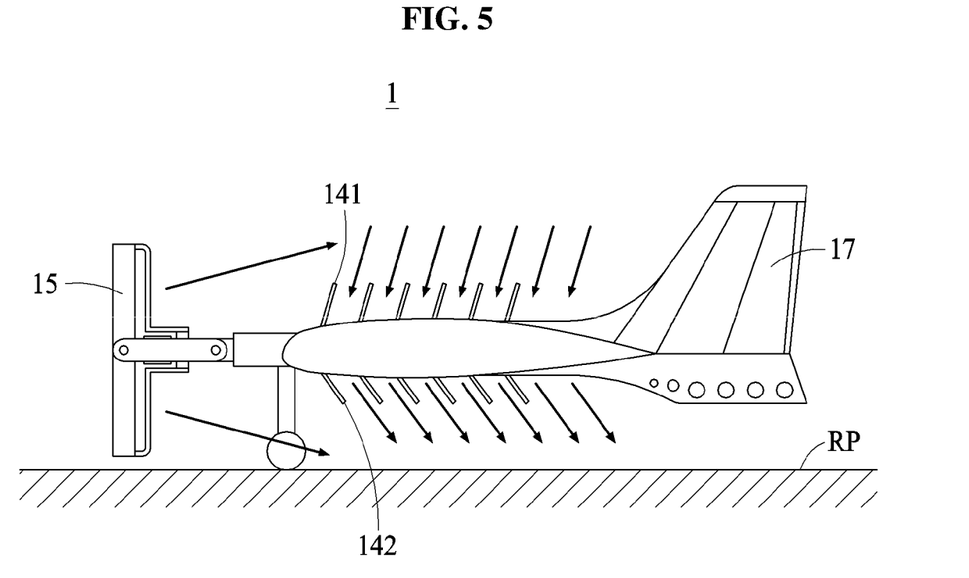
FIG. 5 is a side view of a fan-in-wing aerial vehicle during another example forward flight on a reference plane according to an example embodiment.
Figure 6:
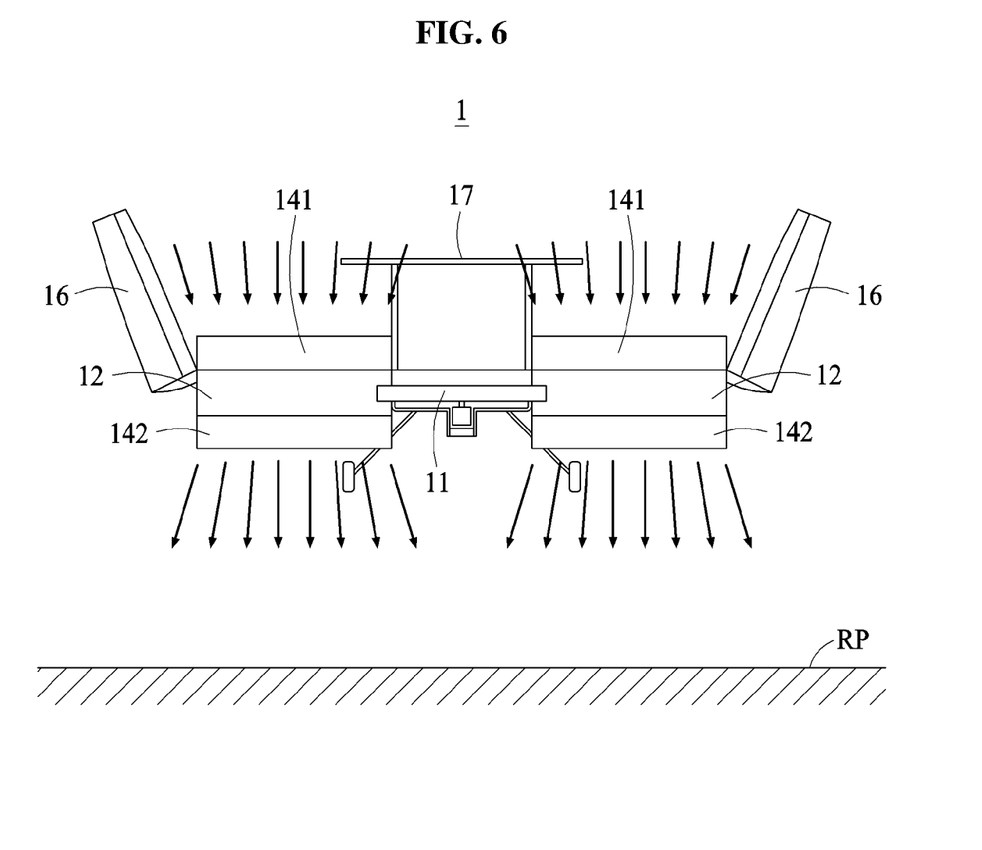
FIG. 6 is a front view of a fan-in-wing aerial vehicle according to an example embodiment.

According to an example embodiment, referring to FIG. 5, the upper hatch 141 is configured to be tilted to form a set angle with the RP upwards and rearwards from the fuselage 11, and remain tilted. The lower hatch 142 is configured to be tilted to form a set angle with the RP downwards and rearwards from the fuselage 11, and remain tilted. Thus, air flowing along the upper hatch 141 from the rear of the fuselage 11 may flow through the rotary wing 13 and then flow along the lower hatch 142 downwards and rearwards from the fuselage 11, and thus the aerial vehicle 1 may obtain a forward propulsive force and make a forward flight.

Thus, based on an angle at which the upper hatch 141 and the lower hatch 142 are tilted with respect to the RP, a posture of the aerial vehicle 1 may be controlled in various ways. Thus, the aerial vehicle 1 may fly in various flight modes, for example, a vertical takeoff and landing mode, a hovering flight mode, and a forward flight mode.

At least one of the upper hatch 141 or the lower hatch 142 is formed in the fixed wing 12 to extend in a span direction of the fixed wing 12. For example, the upper hatch 141 and the lower hatch 142 may be provided as a plurality of upper hatches and a plurality of lower hatches, respectively. In this example, each of the upper hatches 141 and the lower hatches 142 may be connected to the fixed wing 12 through hinged connection. Through such a structure in which at least one of the upper hatch 141 or the lower hatch 142 is formed in the fixed wing 12 to extend in the span direction of the fixed wing 12, it is possible to close the upper hatch 141 and/or the lower hatch 142 from an outside when the aerial vehicle 1 flies forwards, and it is thus possible to prevent the upper hatch 141 and the lower hatch 142 from being damaged by an air pressure and to reduce a loss caused by air resistance.

For example, when the upper hatch 141 and the lower hatch 142 are provided as a plurality of upper hatches and a plurality of lower hatches, respectively, the upper hatches 141 and the lower hatches 142 may be tilted with respect to the fuselage 11 at various angles, respectively.

The sub rotary wing 15 is rotatably installed in the fuselage 11, and configured to be tilted with respect to the RP. The sub rotary wing 15 includes a duct, a blade including a blade tip, and a hinge. A structure of the rotary wing 13 described above with reference to FIG. 7 may also be applied to a structure of the sub rotary wing 15, and such application may be obvious to those skilled in the art.

The sub rotary wing 15 is disposed at least one of a front portion 111 of the fuselage 11 and a rear portion 112 of the fuselage 11. Through such a structure, the sub rotary wing 15 is configured to be rotated and/or tilted in a pitch and/or roll direction of the aerial vehicle 1, and thus the aerial vehicle 1 may obtain a propulsive force for a forward flight, and maintain a set posture during a flight in the air. A propulsive force generated in the aerial vehicle 1 by the sub rotary wing 15, and a propulsive force generated in the aerial vehicle 1 by the upper hatch 141 and the lower hatch 142 may be adjustable based on a posture of the aerial vehicle 1. The sub rotary wing 15 may be adjusted to be tilted in the pitch direction, the roll direction, or the yaw direction of the aerial vehicle 1, and thus may control a posture of the aerial vehicle 1. A speed of rotation of the sub rotary wing 15 may be adjusted.

According to an example embodiment, referring to FIG. 2, the sub rotary wing 15 is configured to be tilted with respect to the RP such that an axis of the sub rotary wing 15 is vertical to the RP, and remain tilted. Thus, air may flow through the sub rotary wing 15 from above the fuselage 11 in front of the fuselage 11 to below the fuselage 11, and thus the aerial vehicle 1 may obtain a propulsive force vertical to the RP.

According to an example embodiment, referring to FIG. 3, even when the fuselage 11 is tilted with respect to the RP, the sub rotary wing 15 is configured to be tilted such that the axis of the sub rotary wing 15 is vertical to an axis in the chord direction of the fixed wing 12 as illustrated in FIG. 1, and remain tilted. Thus, a propulsive force slant towards a down side of the fuselage 11 from a front side of the fuselage 11 may generated, and thus the aerial vehicle 1 may make a vertical takeoff and landing.

According to an example embodiment, referring to FIGS. 4 and 5, the sub rotary wing 15 is configured to be tilted such that the axis of the sub rotary wing 15 is parallel to the axis in the chord direction of the fixed wing 12 as illustrated in FIG. 1, and remain tilted. Thus, air may flow from a front side of the fuselage 11 to a down side of the fuselage 11 through the sub rotary wing 15, and thus the aerial vehicle 1 may obtain a forward propulsive force.

Figure 8:
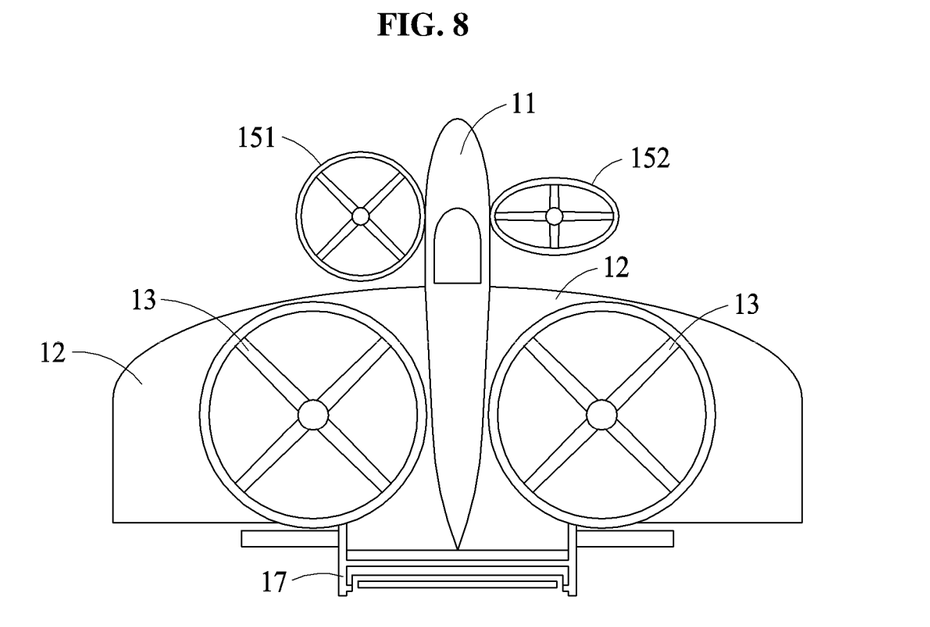
FIG. 8 is a bottom view of a fan-in-wing aerial vehicle during a vertical takeoff and landing or during a hovering flight in the air according to an example embodiment.

According to an example embodiment, referring to FIG. 8, the sub rotary wing 15 includes a first sub rotary wing 151 and a second sub rotary wing 152. The first sub rotary wing 151 is rotatably installed on one side of the fuselage 11, and the second sub rotary wing 152 is rotatably installed on another side of the fuselage 11, which is an opposite side of the first sub rotary wing 151. Through such a structure, the first sub rotary wing 151 and the second sub rotary wing 152 may be adjusted to be tilted with respect to the RP, and thus it is possible to control a yaw posture of the aerial vehicle 1 based on a difference between propulsive forces on a left side and a right side of the aerial vehicle 1. A speed of rotation of the first sub rotary wing 151 and a speed of rotation of the second sub rotary wing 152 may be adjusted independently.

Referring back to FIGS. 1 through 6, the outboard 16 is configured to be folded and unfolded upwards from the fuselage 11 or downwards from the fuselage 11. For example, the outboard 16 is installed at an edge of the fixed wing 12 and connected thereto through a hinged connection inside the fixed wing 12, and may thus be folded and unfolded upwards from the fuselage 11 or downwards from the fuselage 11. Through such a structure, it is possible to reduce a constant force or a drag force received by the fixed wing 12 when the aerial vehicle 1 makes a vertical takeoff or landing, or a hovering flight in the air, and thus to increase an operation efficiency of the rotary wing 13. In addition, it is possible to minimize a space needed to stop or suspend the aerial vehicle 1 on the RP.

The tail wing 17 is installed in the rear portion 112 of the fuselage 11 for lateral movement and horizontal alignment of the aerial vehicle 1. However, when the sub rotary wing 15 is installed in the rear portion 112 of the fuselage 11, the tail wing 17 may be omitted.

Hereinafter, a structure of a fan-in-wing aerial vehicle 2 and a method of controlling a posture thereof according to another example embodiment will be described in detail with reference to FIG. 9.

Figure 9:
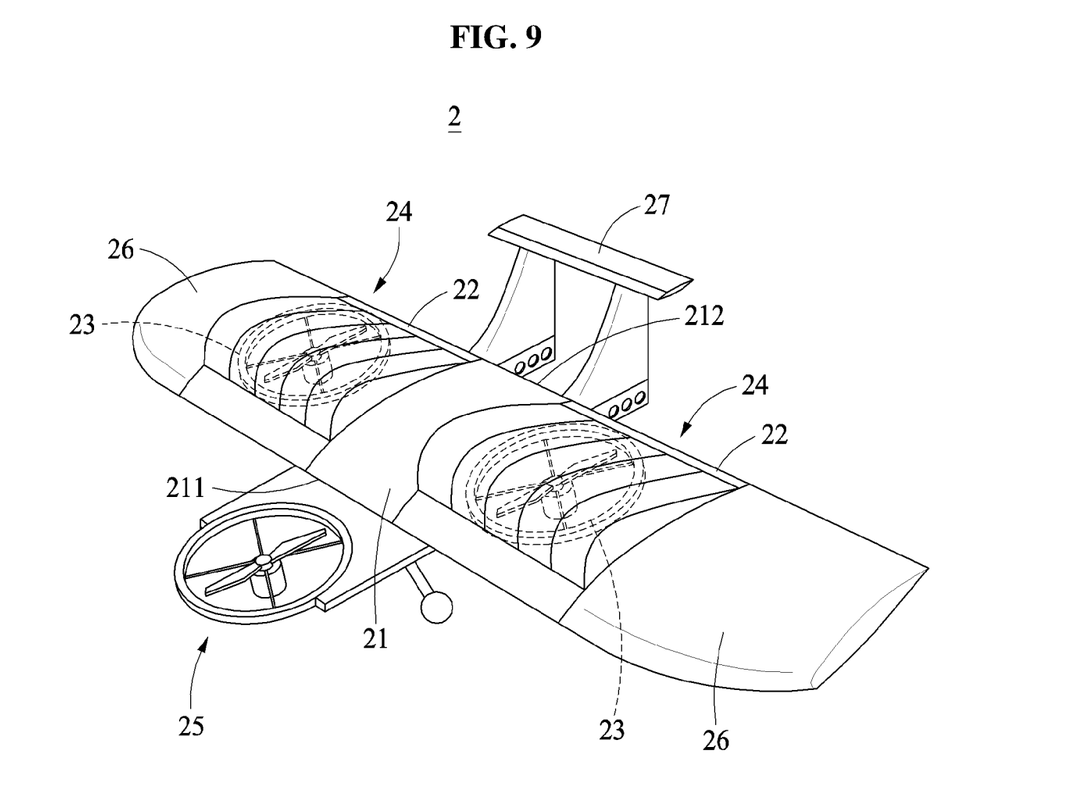
FIG. 9 is a perspective view of a fan-in-wing aerial vehicle according to another example embodiment.

Referring to FIG. 9, the fan-in-wing aerial vehicle 2 includes a fuselage 21, a fixed wing 22, a rotary wing 23, an opening and closing portion 24, a sub rotary wing 25, an outboard 26, and a tail wing 27.

The opening and closing portion 24 includes an upper hatch 241 and a lower hatch 242. At least one of the upper hatch 241 or the lower hatch 242 is formed in the fixed wing 22 to extend in a chord direction of the fixed wing 22. When the aerial vehicle 2 flies forwards, such a structure in which the upper hatch 241 and the lower hatch 242 are formed in the fixed wing 22 to extend in the chord direction of the fixed wing 22 may absorb more air into the rotary wing 23 through the upper hatch 241 and the lower hatch 242, compared to a structure in which the upper hatch 241 and the lower hatch 242 are formed in the fixed wing 22 to extend in a span direction of the fixed wing 22. In addition, as the upper hatch 241 and the lower hatch 242 are configured to tilted with respect to a reference plane (RP), it is possible to control a posture of the aerial vehicle 2 in a roll direction.

Hereinafter, a structure of a fan-in-wing aerial vehicle 3 and a method of controlling a posture thereof according to still another example embodiment will be described in detail with reference to FIG. 10.

Figure 10:
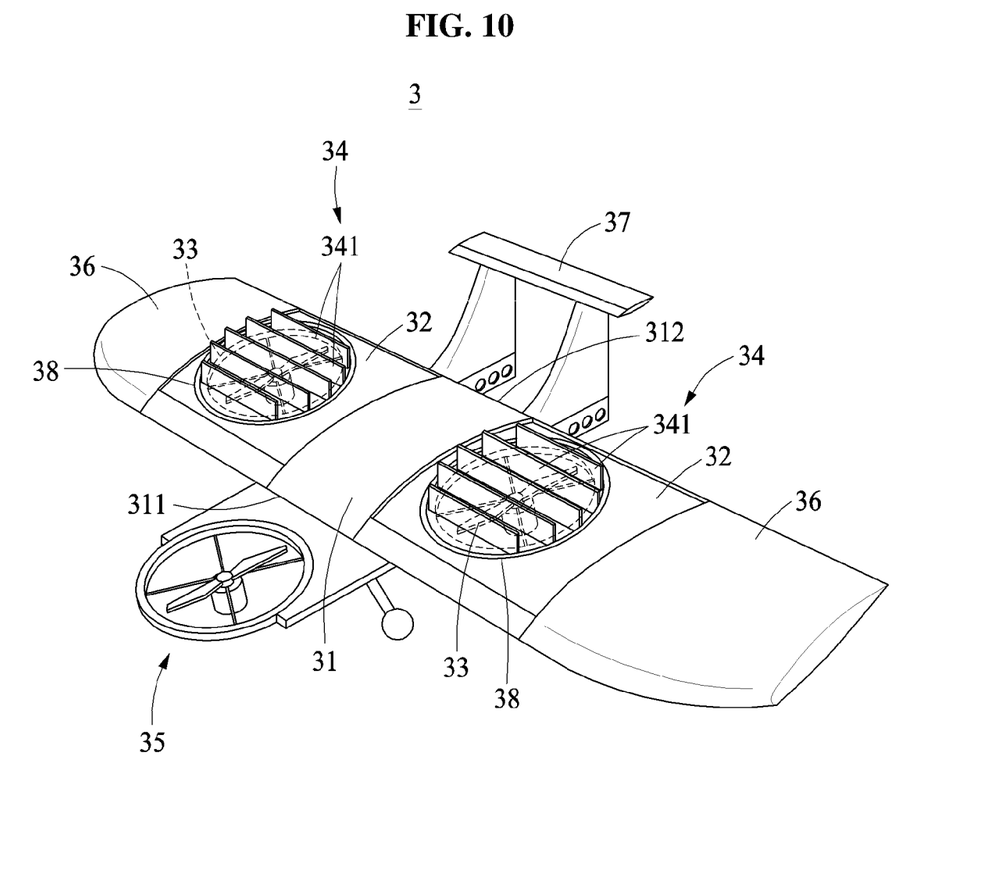
FIG. 10 is a perspective view of a fan-in-wing aerial vehicle according to still another example embodiment.

Referring to FIG. 10, the fan-in-wing aerial vehicle 3 includes a fuselage 31, a fixed wing 32, a rotary wing 33, an opening and closing portion 34 including an upper hatch 341 and a lower hatch 342, a sub rotary wing 35, an outboard 36, a tail wing 37, and a direction switcher 38.

The direction switcher 38 is installed in the fixed wing 32, and configured to change a direction of the upper hatch 341 and a direction of the lower hatch 342. In such a case, the upper hatch 341 and the lower hatch 342 are installed inside the direction switcher 38. For example, when the upper hatch 341 and the lower hatch 342 extend in a span direction of the fixed wing 32, the direction switcher 38 is configured to allow the upper hatch 341 and the lower hatch 342 to rotate on the fixed wing 32 such that the upper hatch 341 and the lower hatch 342 extend in a chord direction of the fixed wing 32. To minimize air resistance by an air pressure during a forward flight of the aerial vehicle 3 through such a structure, the direction switcher 38 is configured to allow the upper hatch 341 and the lower hatch 342 to rotate such that the upper hatch 341 and the lower hatch 342 extend in the span direction of the fixed wing 32. In contrast, to absorb more air into the aerial vehicle 3 through such a structure, the direction switcher 38 is configured to allow the upper hatch 341 and the lower hatch 342 to rotate such that the upper hatch 341 and the lower hatch 342 extend in the chord direction of the fixed wing 32. Thus, by simply switching the directions of the upper hatch 341 and the lower hatch 342, a desired flight mode may be performed.

In an example, a plurality of rotary wings may be provided as the rotary wing 33, and the rotary wings 33 may be arranged separately from each other in the span direction of the fixed wing 32. In this example, a plurality of direction switchers may be provided as the direction switcher 38, and installed in the fixed wing 32. In this example, to extend, identically or differently, respective upper hatches 341 and lower hatches 342 of the rotary wings 33 which allow the rotary wings 33 to be opened to or closed from an outside, the direction switchers 38 may change directions of the upper hatches 341 and the lower hatches 342. For example, when crosswind blows towards the fuselage 31, the direction switcher 38 may change a direction of the upper hatch 341 and a direction of the lower hatch 342 such that a direction of the upper hatch 341 to be extended and a direction of the lower hatch 342 to be extended may be parallel to the chord direction of the fixed wing 32. Thus, the aerial vehicle 3 may move in a direction in which the crosswind blows while a front of the aerial vehicle 3 is maintaining a front side thereof. Through such a structure, the direction switchers 38 may change individually the respective directions of the upper hatches 341 and the lower hatches 342, and thus the aerial vehicle 3 may make a forward flight while maintaining a front side thereof and travel laterally with the front thereof facing the front side, and also change an angle of the front in place.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

The invention claimed is:

1. A fan-in-wing aerial vehicle comprising:
a fuselage;
a fixed wing extending from both a first side and second side of the fuselage in a span direction;
a rotary wing rotatably mounted inside the fixed wing;
a direction switcher installed in the fixed wing;
an opening and closing portion installed inside the direction switcher, wherein the opening and closing portion is configured such that the rotary wing inside the fixed wing is covered in a closed state and uncovered in an open state, and wherein the opening and closing portion comprises:
an upper hatch disposed above the rotary wing and configured to be tilted with respect to a reference plane; and
a lower hatch disposed below the rotary wing and configured to be tilted with respect to the reference plane, a first sub rotary wing rotatably installed on the first side of the fuselage; and
a second sub rotary wing rotatably installed on the second side, which is located laterally opposite of the first side of the fuselage,
wherein the direction switcher is configured to allow at least one of the upper hatch and the lower hatch to rotate in the reference place with respect to the fixed wing between an orientation parallel to the span direction and an orientation parallel to a chord direction, and
wherein the first sub rotary wing and the second sub rotary wing are configured to be tilted, independently, with respect to the reference plane, to control a yaw posture of the fan-in-wing aerial vehicle.

2. The fan-in-wing aerial vehicle of claim 1, wherein at least one of the upper hatch or the lower hatch is formed on the fixed wing to extend in the span direction of the fixed wing, or formed on the fixed wing to extend in the chord direction of the fixed wing.

3. The fan-in-wing aerial vehicle of claim 1, wherein each of the upper hatch and the lower hatch is configured to rotate with respect to the fixed wing.

4. The fan-in-wing aerial vehicle of claim 1, wherein the fixed wing further comprises an outboard portion configured to be folded and unfolded upwards or downwards from the fuselage.

5. The fan-in-wing aerial vehicle of claim 1, further comprises:
a duct installed in the fixed wing;
a blade of the rotary wing rotatably installed at a center of the duct in a radial direction of the duct; and
a hinge configured to connect the duct and a blade tip of the blade.

6. A fan-in-wing aerial vehicle comprising:
a fuselage;
a fixed wing extending from both a first side and second side of the fuselage in a span direction;
a rotary wing rotatably mounted inside the fixed wing;
a direction switcher installed in the fixed wing;
an upper hatch installed inside the direction switcher, disposed above the rotary wing, and configured to be tilted with respect to a reference plane; and
a lower hatch installed inside the direction switcher, disposed below the rotary wing, and configured to be tilted with respect to the reference plane,
wherein a tilting angle of at least one of the upper hatch or the lower hatch is controlled to allow the rotary wing to be covered or uncovered by at least one of the upper hatch or the lower hatch,
a first sub rotary wing rotatably installed on the first side of the fuselage; and
a second sub rotary wing rotatably installed on the second side, which is located laterally opposite of the first side of the fuselage,
wherein the first sub rotary wing and the second sub rotary wing are configured to be tilted, independently, with respect to a reference plane, to control a yaw posture of the fan-in-wing aerial vehicle, and
wherein the direction switcher is configured to allow at least one of the upper hatch and the lower hatch to rotate in the reference place with respect to the fixed wing between an orientation parallel to the span direction and an orientation parallel to a chord direction.

7. The fan-in-wing aerial vehicle of claim 6, wherein the upper hatch and the lower hatch are configured to be tilted, independently, with respect to the reference plane.

8. The fan-in-wing aerial vehicle of claim 7, wherein, the upper hatch and the lower hatch are configured to be tilted vertically with respect to the reference plane and remain tilted for vertical takeoff and landing.

9. The fan-in-wing aerial vehicle of claim 7, wherein, the upper hatch and the lower hatch are configured to be tilted at a set angle with respect to the reference plane towards a rear of the fan-in-wing aerial vehicle and remain tilted for forward flight on the referenced plane.

* * * * *